(12) United States Patent
Gahlmann et al.

(10) Patent No.: US 6,500,554 B2
(45) Date of Patent: Dec. 31, 2002

(54) PROCESS FOR PRODUCING AN EXTRUSION-COATED METAL ARTICLE

(75) Inventors: Klaus Gahlmann, Marl (DE); Walter Hellermann, Dorsten (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/797,950

(22) Filed: Mar. 5, 2001

(65) Prior Publication Data

US 2001/0023537 A1 Sep. 27, 2001

(30) Foreign Application Priority Data

Mar. 4, 2000 (DE) .......................... 100 10 669

(51) Int. Cl.⁷ .......................... B32B 29/20; B32B 15/08
(52) U.S. Cl. ................ 428/450; 428/35.8; 428/35.9; 428/36.9; 428/36.91; 428/447; 428/448; 428/451; 427/327; 427/387; 427/388.1; 138/DIG. 4; 138/327; 138/387; 138/388.1
(58) Field of Search ................ 428/450, 447, 428/448, 451, 35.8, 35.9, 36.9, 36.91; 427/327, 387, 366.1; 138/DIG. 4, 140, 141, 142, 145

(56) References Cited

U.S. PATENT DOCUMENTS

| 3,088,847 | A | | 5/1963 | Pines |
| 3,944,574 | | | 3/1976 | Marsden et al. |
| 4,038,456 | | | 7/1977 | Marsden et al. |
| 4,247,436 | | * | 1/1981 | Buning et al. .............. 156/329 |
| 5,167,706 | | | 12/1992 | Kuszaj |
| 5,271,977 | | * | 12/1993 | Yoshikawa et al. ......... 138/138 |
| 5,389,410 | | * | 2/1995 | Mugge et al. ............ 428/34.1 |
| 5,397,390 | | | 3/1995 | Gorecki |
| 5,520,223 | | * | 5/1996 | Iorio et al. .................. 138/137 |
| 5,639,555 | | * | 6/1997 | Bishop ....................... 428/447 |
| 5,789,080 | | | 8/1998 | Grimberg et al. |
| 5,867,883 | | * | 2/1999 | Iorio et al. .................... 29/460 |
| 6,325,107 | | * | 12/2001 | Usui ......................... 138/142 |
| 6,358,581 | | * | 3/2002 | Usui ......................... 138/141 |

FOREIGN PATENT DOCUMENTS

DE        25 28 398        1/1976

OTHER PUBLICATIONS

Patent Abstracts of Japan, vol. 1997, No. 10, Oct. 31, 1997, JP 09 169079, Jun. 30, 1997.

* cited by examiner

Primary Examiner—Robert Dawson
Assistant Examiner—Jeffrey B. Robertson
(74) Attorney, Agent, or Firm—Oblon, Spivak, McClelland, Maier & Neustadt, P.C.

(57) ABSTRACT

An extrusion-coated metal article is prepared by applying a mixture which comprises an organosilane composition to a metal surface, and then extruding a melt of a polyamide molding composition onto the coated surface thus treated and dried.

49 Claims, No Drawings

PROCESS FOR PRODUCING AN EXTRUSION-COATED METAL ARTICLE

BACKGROUND OF THE INVENTION

1. Field of the Invention

The present invention relates to a process for producing a metal article, the surface of which has been pretreated with a silane composition and then extrusion-coated with a polyamide molding composition. More particularly, the invention relates to correspondingly extrusion-coated metal profiles.

2. Description of the Background

Metal articles intended for applications in which they have exposure to corrosive environments may be extrusion-coated with a polyamide molding composition. This coating not only acts as a barrier to access of a corrosive agent to the metal surface, but also gives the surface some degree of mechanical protection, for example against exposure to friction or impact. This protection is especially desirable if the surface prior to coating has also undergone treatment for corrosion protection. An essential precondition here is that the coating applied by extrusion adheres firmly, so that mechanical damage does not cause the corrosive agent, such as water or aqueous saline solution, to migrate along the underside of the coating.

If the metal article is composed of aluminum or of an aluminum alloy, for example, it has been standard practice to pretreat the metal by chromatizing the metal. The chromatizing firstly improves the adhesion of the polyamide molding composition applied, and even the chromate layer itself brings about an improvement in corrosion resistance. Examples of appropriate applications in the automotive industry include fuel lines, servo control lines and water-cooling lines. This method provides an adequate improvement in corrosion resistance, and also in the adhesion of the polyamide layer. However, the carcinogenic property of the chromium(VI) compounds used in the chromatizing bath is causing the automotive industry to eliminate chromatizing as metal pretreatment step. A need, therefore, exists for a suitable metal pretreatment process which is acceptable as a replacement for chromatizing and also which imparts the metal surface with adequate protection from corrosion and at the same time enables the applied polyamide layer to firmly adhere to the metal. It would also be desirable to be able to use this method to provide effective corrosion protection to articles composed of other metals, such as steel, brass or zinc.

JP-A 9-169079 discloses that an aluminum sheet can be firmly bonded to a polyamide film if the aluminum sheet is first treated with the aqueous solution of an epoxy silane and then, after drying, a polyamide film is used to produce a compression bond at a temperature at which the polyamide is molten. In the examples a bond with nylon-12 is produced by hot lamination for a period of 2 minutes at 240° C. These results are not transferable to extrusion coating, since no significant pressure is exerted on the bond here, and especially since the contact time during which the polyamide applied remains molten and can bind to the surface is of the order of magnitude of a few seconds. It could not, therefore, be expected that the suitability of silanes as adhesion promoters will extend to the extrusion-coating of metals with polyamide, giving the desired corrosion protection.

SUMMARY OF THE INVENTION

Accordingly, one object of the present invention is to provide metal surfaces with adequate protection from corrosion by the application of an extruded coating thereto which at the same time enables a subsequently applied polyamide layer to firmly adhere to the metal.

Briefly, this object and other objects of the present invention as hereinafter will become more readily apparent can be attained by an extrusion-coated metal article which is prepared by a process comprising 1) applying a mixture which comprises an organosilane composition which is prepared from
   a) Q mols. of alkoxysilanes which have a functional group and have the formula:

   $$A\text{—}Si(R^1)_y(OR^*)_{3-y}, \text{ and} \qquad \qquad I$$

b) M mols. of alkoxysilanes selected from the group consisting of
   α) trialkoxysilanes of the formula:

   $$R^2\text{—}Si(OR^{**})_3 \qquad \qquad II$$

and/or from the group consisting of
   β) dialkoxysilanes of the formula:

   $$R^3R^4Si(OR^{***})_2 \qquad \qquad III$$

and/or from the group consisting of
   γ) alkoxy compounds of the formula:

   $$Me(OR^{****})_n, \qquad \qquad IV$$

wherein A is a substituent which has, bonded directly or via an aliphatic or aromatic hydrocarbon radical to silicon, thereto at least one amino, alkylamino, dialkylamino, amido, epoxy, acryloxy, methacryloxy, cyano, isocyanato, ureido, thiocyanato, mercapto, sulfane or halo group,
   $R^1$ is methyl, ethyl or A which is defined above,
   y is 0 or 1,
   $R^*, R^{}, R^{*}$ and $R^{****}$, independently of one another, are an alkyl group having from 1 to 8 carbon atoms or a corresponding alkyl group which is substituted by an alkyl [(poly)ethylene glycol] radical,
   $R^2, R^3$ and $R^4$, independently of one another, are an alkyl, alkenyl, alkynyl, cycloalkyl, cycloalkenyl or aromatic group, in each case having not more than 18 carbon atoms, or a group of this type which is partially fluorinated or perfluorinated and/or is substituted by alkyloxy and/or by aryloxy groups,
   Me is selected from the group consisting of Si (n=4) and metals, such as Ti (n=4), Zr (n=4), Al (n=3) and Zn (n=2),
   with the proviso that
   the molar ratio of M and Q is $0 \leq M/Q \leq 20$, preferably $0 \leq M/Q \leq 12$, particularly preferably $0 \leq M/Q \leq 7$ an very particularly preferably $0 \leq M/Q \leq 4$
   on average, at least 2.4 alkoxy groups $OR^*, OR^{}, OR^{*}$ or, respectively, $OR^{****}$, particularly preferably at least 2.5 alkoxy groups and very particularly preferably at least 2.6 alkoxy groups, are present in the mixture of the compounds I to IV for each silicon atom and, respectively, metal atom, and
   if concomitant use is made of one of the metal compounds mentioned as compound IV, the atomic ratio of metal/Si in the mixture of compounds I to IV is not more than 4:6, preferably not more than 3:7 and particularly preferably not more than 2:8, to a metal surface; and 2) extruding a melt of a polyamide molding composition onto the surface thus treated and dried.

DETAILED DESCRIPTION OF THE PREFERRED EMBODIMENTS

Surprisingly, however, it has now been found that an extrusion-coated metal article which fulfills the above-stated requirements can be produced by the process described above Suitable examples of metal surfaces which can be coated by the process of the invention include aluminum, its alloys, steel, brass and zinc. The examples include galvanized steel and aluminum-coated metal.

The metal article to be coated is preferably a profile, such as a tube, in particular a component of an automobile, such as a fuel line, a servo control line, a water-cooling line, a brake line or a line in an air-conditioning system. The tube is preferably composed of aluminum or of an aluminum alloy.

The mixture of materials to be applied to a metal surface generally comprises from 0.05 to 8% by weight of the organosilane composition, calculated on the basis of the dry residue obtained from its hydrolysate, preferably from 0.1 to 6% by weight, particularly preferably from 0.2 to 5% by weight and in particular from 0.3 to 4% by weight, in a suitable solvent, e.g. in water, in an alcohol or in an alcohol-water mixture.

For the purposes of the present invention, the dry residue from the organosilane composition is defined as the amount of solid remaining after storing a specified amount of the hydrolysate (about 1 g) in a weighing dish for 1 h at 125° C. in a drying cabinet. For the gravimetric analysis, the weighing dish is cooled for 20 minutes to room temperature in a desiccator after the end of the drying procedure and reweighed precisely to 1 mg on an analytical balance.

Suitable examples of the alkoxysilane which has a functional group and has the formula:

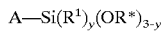

include 3-aminopropyltrimethoxysilane, 3-aminopropyltriethoxysilane, 3-pyrrolidinopropyltrimethoxysilane, N-methyl-3-aminopropyltrimethoxysilane, 3-aminopropylmethyldiethoxysilane, N-aminoethyl-3-aminopropyltrimethoxysilane, N-(benzylaminoethyl)-3-aminopropyltrimethoxysilane, p-anilinotriethoxysilane, 4-aminobutylmethyldiethoxysilane, $(CH_3O)_3Si$—$C_3H_6$—NH—$C_2H_4$—$NH_2$,

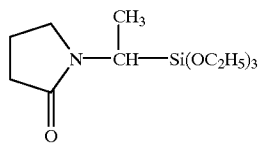

3-glycidyloxypropyltrimethoxysilane,

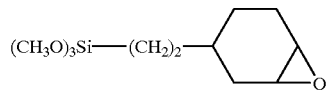

$CH_2$=$C(CH_3)$—COO—$C_3H_6$—$Si(OCH_3)_3$,
$CH_2$=CH—COO—$C_3H_6$—$Si(OC_2H_5)_3$,
3-cyanopropyltrimethoxysilane,
3-cyanopropyltriethoxysilane,
3-isocyanatopropyltriethoxysilane,
ureidopropyltrimethoxysilane,
3-thiocyanatopropyltrimethoxysilane,
3-mercaptopropyltrimethoxysilane,
3-mercaptopropylmethoxysilane,
3-mercaptopropylmethyldimethoxysilane,
4-mercaptobutyltrimethoxysilane,
6-mercaptohexyltrimethoxysilane,
3-chloropropyltrimethoxysilane and

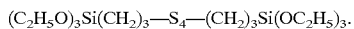

Suitable examples of suitable trialkoxysilanes of the formula:

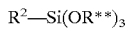     II include methyltrimethloxysilane, methyltriethoxysilane, ethyltrimethoxysilane, ethyltriethoxysilane, n-propyltriethoxysilane, n-butyltrimethoxysilane, isobutyltrimethoxysilane, octyltriethoxysilane, hexadecyltrimetboxysilane, stearyltrimethoxysilane, cyclohexyltrimethoxysilane, cyclohexenylethyltriethoxysilane, phenyltrimethoxysilane, phenyltriethoxysilane, vinyltrimethoxysilane, vinyltriethoxysilane, vinyl-tris(2-methoxyethoxy)silane, allyltrimethoxysilane, allyltriethoxysilane, $CF_3CH_2CH_2$—$Si(OCH_3)_3$, $CF_3CH_2CH_2$—$Si(OC_2H_5)_3$, $C_2F_5CH_2CH_2$—$Si(OCH_3)_3$, $C_4F_9CH_2CH_2$—$Si(OCH_3)_3$, n-$C_6F_{13}CH_2CH_2$—$Si(OC_2H_5)_3$, n-$C_8F_{17}CH_2CH_2Si(OCH_3)_3$ and n-$C_{10}F_{21}CH_2CH_2$—$Si(OCH_3)_3$.

Suitable examples of dialkoxysilanes of the formula:

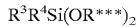     III include dimethyldimethoxysilane, dimethyldiethoxysilane, diethyldimethoxysilane, methylisobutyldiethoxysilane, cyclohexylmethyldimethoxysilane, diphenyldimethoxysilane, diphenyldiethoxysilane, methylphenyldimethoxysilane and $CF_3CH_2CH_2Si(CH_3)(OCH_3)_2$.

Suitable examples of suitable alkoxy compounds of the formula:

     IV include tetramethoxysilane, tetraethoxysilane, tetra(n-propoxy)silane, tetra(n-butoxy)silane, tetra(sec-butoxy)silane, tetra(isobutoxy)silane, tetramethoxytitanium, tetraethoxytitanium, tetra(n-propoxy)titanium, tetra (isopropoxy)titanium, tetra(n-butoxy)titanium, tetra (isobutoxy)titanium, tetra(2-ethylhexoxy)titanium, tetramethoxyzirconium, tetraethoxyzirconium, tetra(n-propoxy)zirconium, tetra(isopropoxy)zirconium, tetra(n-butoxy)zirconium, tetra(sec-butoxy)zirconium, tetra (isobutoxy)zirconium, tetra(2-ethylbexoxy)zirconium, trimethoxyaluminum, triethoxyaluminum, tri(n-propoxy) aluminum, tri(isopropoxy)aluminum, tri(n-butoxy) aluminum, tri(isobutoxy)aluminum, tri(sec-butoxy) aluminum, tri(2-ethylhexoxy)aluminum, diethoxyzinc, di(sec-butoxy)zinc and di(2-ethylhexoxy)zinc.

In one preferred embodiment, the organosilane composition is based on silanes of the Formula I which have an epoxy group or an amino group, in particular on 3-glycidyloxypropyltrimethoxysilane or 3-aminopropyltriethoxysilane.

In preparing the organosilane composition it is preferred for the alkoxy compounds to be hydrolyzed to give hydroxyl compounds. In principle it is also conceivable to use other precursor compounds for this purpose, for example halides or acetates. However, if the hydrolysis produces strong acids, the acid production may cause problems in the present process, whereas if the hydrolysis produces weak, volatile acids, such as acetic acid, these types of acids can more readily be tolerated.

However, in other respects the use of appropriate precursor compounds in the present process is equivalent and is also an aspect of the invention.

In a possible embodiment of the invention, the organosilane composition is in the form of a hydrolysate and, concurrent with the hydrolysis, oligomerization or, respectively, polycondensation has also taken place, starting from compounds I to IV.

Compositions of this type in which organopolysiloxane is present may be prepared by various processes. For example, a composition in which organopolysiloxane is present may be prepared from the monomers of formulae I to IV by mixing the composition with water and allowing the mixture to stand at room temperature for at least 3 hours. At least 0.5 mol., preferably at least 1 mol. of water, should be used here for each mol. of the compounds I to IV used. It is also possible for the entire amount of water needed for reaction be present in the mixture at the start of the procedure. Precondensation to give oligomeric structures takes place during the aging period.

In a preferred embodiment of the invention, the mixture of the organosilane composition with water is allowed to stand for at least 4 hours and particularly preferably at least 6 hours at room temperature (about 20° C.). At higher or lower temperatures the aging period has to be adapted correspondingly. A rule of thumb which can be used here is that an increase of 10° C. in the temperature brings about an approximate doubling of the reaction rate.

The composition in which organopolysiloxane is present may, however, also be prepared by mixing the composition as in Formulae I to IV with from 0.5 to 30 mol of water per mol. of the compounds used, and distilling the resulting material to remove the alcohol produced during the reaction. Suitable processes, and also some of the oligomeric structures produced during the reaction, are disclosed in U.S. Pat. No. 5,629,400 and U.S. Pat. No. 5,679,147, which are expressly incorporated herein by way of reference.

If desired, and in particular if one of the compounds I to IV used is highly nonpolar, or if a metal alkoxide is used as compound IV, the initial hydrolysis may be undertaken in an organic solvent which is at least to some extent miscible with water, for example in methanol, ethanol, isopropanol, butanol, dimethoxyethane, tetrahydrofuran or acetone. If metal alkoxides are used together with silanes, it can moreover be advantageous for the silanes first to be hydrolyzed with a little water and then for the metal alkoxide to be admixed, and finally, once equilibrium conditions have been established, for the hydrolysis and further condensation to be completed by adding the remaining amount of water.

The resultant composition may be homogeneous or colloidal. According to the invention it is also possible to use an emulsion as long as the emulsion is stable. The single fundamental precondition which has to be complied with is that no precipitates should be produced over the period of use of the material.

The mixture to be applied to the metal surface and comprising an organosilane composition is generally water-based. For example, it may be prepared by diluting the organosilane composition. The mixture may also comprise auxiliaries, for example flow promoters or substances which hydrophobicize the metal surface without impairing adhesion to the polyamide.

The mixture may be applied to the metal surface by any prior art method, for example by spraying, dipping, applying by roller or spreading. During this procedure the metal surface may be at room temperature, or else may have been heated to a temperature not higher than about 280° C. At least some slight heating is advantageous in order to dry the surface prior to the extrusion-coating which follows.

During coating with the polyamide molding composition, the temperature of the metal surface usually ranges from 10 to 300° C., preferably from 100 to 280° C. and particularly preferably from 200 to 250° C.

The extrusion-coating process is known in the art. With respect to the details of extrusion-coating, reference may be made to F. Hensen, W. Knappe, H. Potente (ed.), Handbuch der Kunststoff-Extrusionstechnik [Plastics Extrusion Technology Handbook], Vol. II, HanserVerlag Munich, Vienna, 1986, pp. 321–353, for example.

For the extrusion-coating, use may be made of any known polyamide which can be processed as a melt. Suitable possible materials for this purpose include primarily aliphatic homo- and copolycondensates, such as PA 46, PA 66, PA 68, PA 612, PA 88, PA810, PA 1010, PA 1012, PA 1212, PA6, PA7, PA8, PA9, PA 10, PA 11 and PA 12. (The identification of the polyamides follows the international standard in which the first figure(s) give(s) the number of carbon atoms in the starting diamine and the last figure(s) give(s) the number of carbon atoms in the dicarboxylic acid. If only one figure is mentioned, this means that the starting material is an $\alpha,\omega$-aminocarboxylic acid or its derivative lactam. Reference may also be made to H. Domininghaus, Die Kunststoffe und ihre Eigenschaften [Plastics and their properties], pp. 272 et seq., VDI-Verlag, 1976.)

If copolyamides are used as the polyamide, the copolyamides may contain adipic acid, sebacic acid, suberic acid, isophthalic acid, terephthalic acid, naphthalene-2,6-dicarboxylic acid, 2,2,4- or 2,4,4-trimethyladipic acid, azelaic acid, 1,12-dodecanedicarboxylic acid, cyclohexane-1,4-dicarboxylic acid, for example, as coacid, and hexamethylenediamine, 2-methyl-1,5-diaminopentane, 2,2,4- or 2,4,4-trimethylhexamethylenediamine, 1,9-nonamethylenediamine, 1,10-decamethylenediamine, 1,12-dodecamethylenediamine, 4,4'-diaminodicyclohexylmethane, 3,3'-dimethyl-4,4'-diaminodicyclohexylmethane, 3-aminomethyl-3,5,5-trimethylcyclohexylamine, for example, or similar compounds as codiamine. It is also possible for lactams, such as caprolactam or laurolactam, or aminocarboxylic acids, such as $\omega$-aminoundecanoic acid, to be incorporated as a co-component in the material for the production of a copolyamide.

The preparation of these polyamides is known (D. B. Jacobs, J. Zimmermann, Polymerization Processes, pp. 424–467, Interscience Publishers, New York, 1977; DE-B 21 52 194, for example).

Other suitable polyamides are mixed aliphatic/aromatic polycondensates, e.g. as described in the U.S. Pat. Nos. 2,071,250; 2,071,251; 2,130,523; 2,130,948; 2,241,322; 2,312,966; 2,512,606 and 3,393,210, and also in Kirk-Othmer, Encyclopedia of Chemical Technology, 3rd edn., Vol. 18, pp. 328 et seq. and 435 et seq., Wiley & Sons, 1982. Other suitable polyamides are poly(etheresteramides) and poly(etheramides). Products of this type are described in DE-A 25 23 991, 27 12 987 and 30 06 961, for example.

Transparent polyamides may also be used for the coating. Polyamides of this type are described in the following publications by way of example: U.S. Pat. No. 2,742,496; CH-B-480 381, CH-B-679 861, DE-A-22 25 938, DE-A-26 42 244, DE-A-27 43 515, DE-A-29 36 759, DE-A-27 32 928, DE-A-43 10 970, EP-A-0 053 876, EP-A-0 271 308, EP-A-0 313 436, EP-A-0 725 100 and EP-A-0 725 101.

The polyamide molding composition may comprise either one of these polyamides or two or more in the form of a mixture.

Good results are achieved if an excess of carboxyl end groups is present in the polyamide molding composition. However, these good results are further improved if the polyamide molding composition has an excess of amino end groups, and this embodiment is, therefore, preferred.

The auxiliaries and additives which are customary for polyamides, e.g. flame retardants, stabilizers, plasticizers, processing aids, pigments or the like, may also be added to the molding composition. The amount added of the agents mentioned should be such as not seriously to impair the properties desired.

It has been found that the adhesion to the treated metal surface can be still further improved if the polyamide molding composition comprises other additives which have been selected from the group consisting of:

oxazolines, e.g. 2-ethyl-2-oxazoline, 2-phenyl-2-oxazoline, 2-isopropenyl-2-oxazoline, 2-ethyl-4-methyl-2-oxazoline, 2-phenyl-4-ethyl-2-oxazoline and 2-phenyl-4-methyl-2-oxazoline. The oxazolines may be used on their own or as a mixture. Based on the polyamide molding composition, use is made of from 0.05 to 10% by weight, preferably from 0.1 to 5% by weight of the oxazoline.

bisoxazolines, e.g. 2,2'-methylenebis(2-oxazoline), 2,2'-ethylenebis(2-oxazoline), 2,2'-ethylenebis(4-methyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline),2,2'-m-phenylenebis(2-oxazoline), 2,2'-o-phenylenebis(2-oxazoline), 2,2'-p-phenylenebis(4-methyl-2-oxazoline),2,2'-m-phenylenebis(4-methyl-2-oxazoline), 2,2'-o-phenylenebis(4-methyl-2-oxazoline), 2,2'-p-phenylenebis(4-methyl-2-oxazoline), 2,2'-m-phenylenebis(4-phenyl-2-oxazoline), 2,2'-o-phenylenebis(4-phenyl-2-oxazoline), 2,2'-bis(2-oxazoline), 2,2'-bis(4-methyl-2-oxazoline),2,2'-bis(4-ethyl-2-oxazoline) and2,2'-bis(4-phenyl-2-oxazoline). These bisoxazolines may be used on their own or as a mixture. Based on the polyamide molding composition, the amount of bisoxazoline ranges from 0.05 to 10% by weight and preferably from 0.1 to 5% by weight.

polyoxazolines which may be prepared by cationic ring-opening polymerization of oxazolines, e.g. of the above-mentioned compounds. Based on the polyamide molding composition, the amount of polyoxazoline ranges from 0.05 to 10% by weight and preferably from 0.1 to 5% by weight.

bifunctional epoxides, e.g. bisphenol diglycidyl ethers or an epoxy resin having an epoxy functionality of at least 2. A wide variety of appropriate compounds is commercially available. Here, too, based on the polyamide molding composition the amount of the bifunctional epoxide ranges from 0.05 to 10% by weight and preferably from 0.1 to 5% by weight.

adhesive resins based on acetophenone-formaldehyde resins or on cyclohexanone-formaldehyde resins. Here, too, a wide variety of appropriate compounds is commercially available. The amounts of the adhesive resins used, based on the polyamide molding composition, likewise vary from 0.05 to 10% by weight and preferably from 0.1 to 5% by weight.

These above additives are particularly efficient with respect to adhesion improvement if the polyamide used has an excess of amino end groups.

Although chromatizing is preferably dispensed with in the present process, it is also possible in another embodiment of the invention to chromatize an aluminum surface to be coated with the method of the present invention. In addition, prior to the treatment with the organosilane composition, the metal surface may be pretreated in any other known manner, for example, as described in U.S. Pat. No. 5,520,223. This method achieves particularly effective corrosion protection combined with particularly good adhesion of the polyamide.

The metal article is generally cooled within a short time after the extrusion coating, for example, with a stream of cold air or cold nitrogen, a water bath or a water spray, in order as quickly as possible to obtain a non-tacky surface essential for further operations. The time, calculated from the moment of melt application, for which the metal article is at a temperature above the crystalline melting point $T_m$ in the case of crystalline molding compositions and, respectively, above $T_g+30°$ C. in the case of amorphous molding compositions is generally not more than 30 seconds, preferably not more than 20 seconds, particularly preferably not more than 12 seconds, with particular preference not more than 8 seconds and very particularly preferably not more than 5 seconds. $T_m$ and the glass transition temperature $T_g$ are determined using the DSC method and taking the second heating curve. This method is familiar to one of skill in the art and does not, therefore, require further explanation.

If required, one or more other polymer layers may be applied to the polyamide layer, either by coextrusion or else by downstream extrusion coating, and an adhesion promoter may also be applied here, if desired. Examples of suitable polymers are thermoplastic elastomers, ionomers made from ethylene-methacrylic acid copolymers, fluoropolymers, such as fluorinated rubbers, other rubbers which may have been functionalized with acid groups or with anhydride groups, and which may moreover comprise fillers, plasticizers and/or a vulcanization system. Other examples are maleic-anhydride-modified ethylene polymers and maleic-anhydride-modified ethylene copolymers. Suitable polymers are described in more detail in U.S. Pat. No. 5,520,223. Layers of this type can improve, for example, the protection of the tube from mechanical effects, such as impacts with stone.

The present process gives metal articles which have effective and lasting corrosion protection. They are used in particular in automotive construction and in mechanical engineering.

The disclosure of German priority Application No. 10010669.2 filed Mar. 4, 2000 is hereby incorporated by reference into the application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. An extrusion-coated metal profile prepared by a process comprising:
   1) applying to a surface of a metal a mixture which comprises an organosilane composition which is prepared from
      a) Q mols. of alkoxysilanes which have a functional group and have the formula:

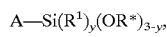
      $$A-Si(R^1)_y(OR^*)_{3-y},\qquad\qquad I$$

and
      b) M mols of alkoxysilanes selected from the group consisting of
         α) trialkoxysilanes of the formula:

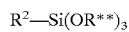
      $$R^2-Si(OR^{**})_3\qquad\qquad II$$

and/or selected from the group consisting of
         β) dialkoxysilanes of the formula:

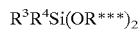
      $$R^3R^4Si(OR^{***})_2\qquad\qquad III$$

and/or selected from the group consisting of
γ) alkoxy compounds of the formula $$Me(OR^{****})_n, \quad \quad IV$$

wherein A is a substituent which has, bonded directly or via an aliphatic or aromatic hydrocarbon radical to silicon, thereto at least one amino, alkylamino, dialkylamino, amido, epoxy, acryloxy, methacryloxy, cyano, isocyanato, ureido, thiocyanato, mercapto, sulfane or halo group, $R^1$ is methyl, ethyl or A which is defined above, y is 0 or 1, $R^*, R^{}, R^{*}$ and $R^{****}$, independently of one another, are an alkyl group having from 1 to 8 carbon atoms or a corresponding alkyl group which is substituted by an alkyl poly(ethylene glycol) radical, $R^2, R^3$ and $R^4$, independently of one another, are an alkyl, alkenyl, alkynyl, cycloalkyl, cycloalkenyl or aromatic group, in each case having not more than 18 carbon atoms, or said group is partially fluorinated or perfluorinated and/or is substituted by alkyloxy and/or by aryloxy groups, Me is selected from the group consisting of Si (n=4), Ti (n=4), Zr (n=4), Al (n=3) and Zn (n=2), with the proviso that the molar ratio of M and Q is $0 \leq M/Q \leq 20$, on average, at least 2.4 alkoxy groups OR*, OR, OR* or, respectively, OR****, are present in the mixture of the compounds I to IV for each silicon atom and metal atom, and if concomitant use is made of one of the metal compounds IV, the atomic ratio of metal/Si in the mixture of compounds I to IV is not more than 4:6; and 2) extruding a melt of a polyamide molding composition onto the surface thus treated and dried.

2. The extrusion-coated metal profile as claimed in claim 1, wherein the profile is a tube.

3. The extrusion-coated metal profile as claimed in claim 2, wherein the profile is a component of an automobile.

4. The extrusion-coated metal profile as claimed in claim 3, wherein the profile is a fuel line, a servo control line, a water-cooling line, a brake line or a line in an air-conditioning system.

5. The extrusion-coated metal profile as claimed in claim 1, wherein the metal surface is aluminum, an aluminum alloy, chromatized aluminum, steel, brass or zinc.

6. The extrusion-coated metal profile as claimed in claim 1, wherein the polyamide molding composition has a theoretical excess of amino end groups.

7. The extrusion-coated metal profile as claimed in claim 1, wherein the polyamide molding composition comprises from 0.05 to 10% by weight of additives selected from the group consisting of oxazolines, bisoxazolines, polyoxazolines which are prepared by cationic ring-opening polymerization of oxazolines, bifunctional epoxides or epoxy resins having an epoxy functionality of at least 2, and adhesive resins based on acetophenone-formaldehyde resins or on cyclohexanone-formaldehyde resins.

8. The extrusion-coated metal profile as claimed in claim 1, wherein from the moment of melt application of the polyamide, the profile has been held for not more than 30 seconds at a temperature above $T_m$ in the case of a crystalline molding composition and above $T_g+30°$ C. in the case of an amorphous molding composition.

9. The extrusion-coated metal profile as claimed in claim 1, wherein at least one other polymer layer is applied to the polyamide layer.

10. A process for producing an extrusion-coated metal article, which comprises:

extruding on a surface of a metal a mixture of:

a) Q mols of alkoxysilanes which have a functional group and have the formula:

$$A—Si(R^1)_y(OR^*)_{3-y}, \quad \quad I$$

and b) M mols of alkoxysilanes selected from the group consisting of

α) trialkoxysilanes of the formula:

$$R^2—Si(OR^{**})_3 \quad \quad II$$

and/or selected from the group consisting of

β) dialkoxysilanes of the formula:

$$R^3R^4Si(OR^{***})_2 \quad \quad III$$

and/or selected from the group consisting of

γ) alkoxy compounds of the formula:

$$Me(OR^{****})_n, \quad \quad IV$$

wherein A is a substituent which has, bonded directly or via an aliphatic or aromatic hydrocarbon radical to silicon, thereto at least one amino, alkylamino, dialkylamino, amido, epoxy, acryloxy, methacryloxy, cyano, isocyanato ureido, thiocyanato, mercapto, sulfane or halo group, $R^1$ is methyl, ethyl or A is defined above, y is 0 or 1, $R^*, R^{}, R^{*}$ and $R^{****}$, independently of one another, are an alkyl group having from 1 to 8 carbon atoms or a corresponding alkyl group which is substituted by an alkyl poly(ethylene glycol) radical, $R^2, R^3$ and $R^4$, independently of one another, are an alkyl, alkenyl, alkynyl, cycloalkyl, cycloalkenyl or aromatic group, in each case having not more than 18 carbon atoms, or said group is partially fluorinated or perfluorinated and/or is substituted by alkyloxy and/or by aryloxy groups, Me is selected from the group consisting of Si(n=4), Ti (n=4), Zr (n=4), Al (n=3) and Zn (n=2), with the proviso that the molar ratio of M and Q is $0 \leq M/Q \leq 20$, on average, at least 2.4 alkoxy groups OR*, OR, OR* or, respectively, OR****, are present in the mixture of the compounds I to IV for each silicon atom and metal atom, and if concomitant use is made of one of the metal compounds IV, the atomic ratio of metal/Si in the mixture of compounds I to IV is not more than 4:6; and 2) extruding a melt of a polyamide molding composition onto the surface thus treated and dried.

11. The process as claimed in claim 10, wherein the metal article is a profile.

12. The process as claimed in claim 11, wherein the metal article is a tube.

13. The process as claimed in claim 12, wherein the metal article is a component of an automobile.

14. The process as claimed in claim 13, wherein the metal article is a fuel line, a servo control line, a water-cooling line, a brake line or a line in an air-conditioning system.

15. The process as claimed in claim 10, wherein the surface of the metal article is aluminum, an aluminum alloy, chromatized aluminum, steel, brass or zinc.

16. The process as claimed in claim 10, wherein the polyamide molding composition has an excess of amino end groups.

17. The process as claimed in claim 10, wherein the polyamide molding composition comprises from 0.05 to 10% by weight of additives selected from the group consisting of oxazolines, bisoxazolines, polyoxazolines prepared by cationic ring-opening polymerization of oxazolines, bifunctional epoxides or, respectively, epoxy resins having an epoxy functionality of at least 2, and adhesive resins based on acetophenone-formaldehyde resins or on cyclohexanone-formaldehyde resins.

18. The process as claimed in claim 10, wherein A is sulfane.

19. The process as claimed in claim 10, wherein A is halo.

20. The process as claimed in claim 10, wherein from the moment of melt application of the polyamide the metal article has been held for not more than 30 seconds at a temperature above $T_m$ in the case of a crystalline molding composition and, respectively, above $T_g 30°$ C. in the case of an amorphous molding composition.

21. The process as claimed in claim 10, wherein at least one other polymer layer is applied to the polyamide layer.

22. A method of automobile construction where parts with coated metal surfaces are required, comprising:

employing in said automobile construction metal parts which are extrusion-coated metal profiles of claim 1.

23. A method of mechanical engineering in which coated metal surfaces are required, comprising:

employing in said mechanical engineering process parts which are extrusion-coated metal profiles of claim 1.

24. The extrusion-coated metal profile as claimed in claim 1, wherein A is amino.

25. The extrusion-coated metal profile as claimed in claim 1, wherein A is alkylamino.

26. The extrusion-coated metal profile as claimed in claim 1, wherein A is dialkylamino.

27. The extrusion-coated metal profile as claimed in claim 1, wherein A is amido.

28. The extrusion-coated metal profile as claimed in claim 1, wherein A is epoxy.

29. The extrusion-coated metal profile as claimed in claim 1, wherein A is acryloxy.

30. The extrusion-coated metal profile as claimed in claim 1, wherein A is methacryloxy.

31. The extrusion-coated metal profile as claimed in claim 1, wherein A is cyano.

32. The extrusion-coated metal profile as claimed in claim 1, wherein A is isocyanato.

33. The extrusion-coated metal profile as claimed in claim 1, wherein A is ureido.

34. The extrusion-coated metal profile as claimed in claim 1, wherein A is thiocyanato.

35. The extrusion-coated metal profile as claimed in claim 1, wherein A is mercapto.

36. The extrusion-coated metal profile as claimed in claim 1, wherein A is sulfane.

37. The extrusion-coated metal profile as claimed in claim 1, wherein A is halo.

38. The process as claimed in claim 10, wherein A is amino.

39. The process as claimed in claim 10, wherein A is alkylamino.

40. The process as claimed in claim 10, wherein A is dialkylamino.

41. The process as claimed in claim 10, wherein A is amido.

42. The process as claimed in claim 10, wherein A is epoxy.

43. The process as claimed in claim 10, wherein A is acryloxy.

44. The process as claimed in claim 10, wherein A is methacryloxy.

45. The process as claimed in claim 10, wherein A is cyano.

46. The process as claimed in claim 10, wherein A is isocyanato.

47. The process as claimed in claim 10, wherein A is ureido.

48. The process as claimed in claim 10, wherein A is thiocyanato.

49. The process as claimed in claim 10, wherein A is mercapto.

* * * * *